US011220755B2

(12) United States Patent
Tanaka et al.

(10) Patent No.: US 11,220,755 B2
(45) Date of Patent: Jan. 11, 2022

(54) APPARATUS FOR ALKALINE WATER ELECTROLYSIS, AND GAS PRODUCTION METHOD

(71) Applicant: TOKUYAMA CORPORATION, Shunan (JP)

(72) Inventors: Yasuyuki Tanaka, Shunan (JP); Harumi Sueoka, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 24 days.

(21) Appl. No.: 16/965,150

(22) PCT Filed: Mar. 12, 2019

(86) PCT No.: PCT/JP2019/010092
§ 371 (c)(1),
(2) Date: Jul. 27, 2020

(87) PCT Pub. No.: WO2019/181662
PCT Pub. Date: Sep. 26, 2019

(65) Prior Publication Data
US 2021/0040631 A1 Feb. 11, 2021

(30) Foreign Application Priority Data
Mar. 22, 2018 (JP) .............................. JP2018-055116

(51) Int. Cl.
*C25B 15/08* (2006.01)
*C25B 9/73* (2021.01)
(Continued)

(52) U.S. Cl.
CPC ................ *C25B 15/08* (2013.01); *C25B 1/04* (2013.01); *C25B 9/13* (2021.01); *C25B 9/23* (2021.01); *C25B 9/73* (2021.01)

(58) Field of Classification Search
CPC .... C25B 1/04; C25B 9/13; C25B 9/15; C25B 9/00
See application file for complete search history.

(56) References Cited

U.S. PATENT DOCUMENTS 10,590,552 B2 * 3/2020 Harano ................... C25B 15/02
2008/0257740 A1 * 10/2008 Helmke .................. C25B 15/08
205/82
(Continued)

FOREIGN PATENT DOCUMENTS

CA 2 562 842 A1 4/2007
EP 2 589 425 A1 5/2013
(Continued)

OTHER PUBLICATIONS

International Search Report (PCT/ISA/21 0) issued in PCT/JP2019/010092, dated May 21, 2019.

*Primary Examiner* — Brian W Cohen
(74) *Attorney, Agent, or Firm* — Birch, Stewart, Kolasch & Birch, LLP

(57) ABSTRACT

An apparatus for alkaline water electrolysis including: an electrolysis vessel; first and second gas-liquid separators respectively separating electrolytes and oxygen/hydrogen gas flowing out from anode/cathode chambers; first and second electrolyte tanks respectively storing the electrolytes separated by the first/second gas-liquid separators; oxygen and hydrogen gas feed pipes respectively introducing the separated oxygen/hydrogen gas into gas phase parts of the first/second electrolyte tanks; oxygen and hydrogen gas exhaust pipes respectively allowing oxygen/hydrogen gas to flow out from the gas phase parts of the first/second electrolyte tanks therethrough; and a circulator supplying the electrolytes from the first and second electrolyte tanks to the electrolysis vessel.

9 Claims, 2 Drawing Sheets

(51) Int. Cl.
  *C25B 9/23* (2021.01)
  *C25B 1/04* (2021.01)
  *C25B 9/13* (2021.01)

(56) References Cited

U.S. PATENT DOCUMENTS

| | | | |
|---|---|---|---|
| 2018/0119294 A1* | 5/2018 | Kitagawa | ................ H02S 10/20 |
| 2018/0195183 A1 | 7/2018 | Domon et al. | |
| 2018/0334751 A1 | 11/2018 | Manabe | |
| 2019/0145012 A1* | 5/2019 | Murayama | ................ C25B 9/19 |
| | | | 205/628 |
| 2020/0157694 A1* | 5/2020 | Manabe | ................ C25B 15/085 |

FOREIGN PATENT DOCUMENTS

| | | |
|---|---|---|
| JP | 6008482 B2 | 10/2016 |
| JP | 2017-39982 A | 2/2017 |
| JP | 2017-119895 A | 7/2017 |
| JP | 2017-179557 A | 10/2017 |
| JP | 2017-203218 A | 11/2017 |
| WO | WO 2017/030153 A1 | 2/2017 |
| WO | WO 2017/169204 A1 | 10/2017 |

* cited by examiner

APPARATUS FOR ALKALINE WATER ELECTROLYSIS, AND GAS PRODUCTION METHOD

FIELD

The present invention relates to an apparatus for alkaline water electrolysis, and a gas production method according to the alkaline water electrolysis method.

BACKGROUND

The alkaline water electrolysis method is known as a method for producing hydrogen gas and oxygen gas. In the alkaline water electrolysis method, water is electrolyzed using a basic water solution (alkaline water) in which an alkali metal hydroxide (such as NaOH and KOH) dissolves as an electrolyte, which generates hydrogen gas at a cathode and oxygen gas at an anode. An electrolytic cell for alkaline water electrolysis usually includes an anode chamber and a cathode chamber which are separated by an ion-permeable separating membrane, and water is electrolyzed as an electrolyte is circulated through each of the anode and cathode chambers. The electrolyte retrieved from each chamber is once collected and stored in a circulator tank, and the electrolyte stored in the circulator tank is supplied to each chamber again.

CITATION LIST

Patent Literature

Patent Literature 1: JP 2017-039982 A
Patent Literature 2: JP 6008482 B2
Patent Literature 3: JP 2017-119895 A
Patent Literature 4: JP 2017-203218 A
Patent Literature 5: JP 2017-179557 A

SUMMARY

Technical Problem

There is a problem of a dissolved gas in a production process of hydrogen gas and oxygen gas using alkaline water electrolysis. That is, part of oxygen gas generated in an anode reaction dissolves in an electrolyte retrieved from an anode chamber, and part of hydrogen gas generated in a cathode reaction dissolves in an electrolyte retrieved from a cathode chamber. The electrolyte retrieved from the anode chamber and the electrolyte retrieved from the cathode chamber are mixed in a circulator tank, which results in both oxygen gas and hydrogen gas dissolving in the electrolyte in the circulator tank. Since oxygen gas and hydrogen gas dissolving in the electrolyte in the circulator tank are gradually released into a gas phase, the concentrations of oxygen gas and hydrogen gas in the gas phase part in an upper part of the circulator tank gradually increase. Therefore, the gas composition in the gas phase part in the upper part of the circulator tank may reach a flammability limit while an electrolysis apparatus is continuously operated.

As to an electrolytic process for generating hydrogen gas, for example, Patent Literature 1 describes an electrolytic apparatus comprising: an anode chamber that houses an anode and generates anode gas; a cathode chamber that houses a cathode and generates hydrogen gas; a diaphragm that separates the anode chamber and the cathode chamber from each other; and an anode side circulation line that discharges an electrolytic solution from the anode chamber and returns the electrolytic solution to the anode chamber, wherein the anode side circulation line includes: an anode side gas-liquid separation unit that separates the anode gas from the electrolytic solution; an anode side discharge line that connects the anode chamber to the anode side gas-liquid separation unit, discharges the electrolytic solution and the anode gas from the anode chamber, and feeds the electrolytic solution and the anode gas to the anode side gas-liquid separation unit; and an anode side supplying line that connects the anode chamber to the anode side gas-liquid separation unit, discharges the electrolytic solution from the anode side gas-liquid separation unit, and feeds the electrolytic solution to the anode chamber, the electrolytic apparatus further comprises an anode gas feeding line that connects the anode side gas-liquid separation unit to a gas phase region in which the anode gas is mixed with hydrogen gas derived from the dissolved hydrogen gas and existing as a gas phase, the anode gas feeding line feeding at least part of the anode gas to the gas phase region, and the concentration of the hydrogen gas in the gas phase region is less than a lower limit value of an explosion limit. Patent Literature 1 insists that the aspect of Patent Literature 1 can surely remove the possibility that gradual accumulation of a very small amount of gas in the circulation line of the electrolytic solution leads to the explosion limit of hydrogen in an electrolytic process for generating hydrogen.

Patent Literature 1 however describes that gas discharged from the gas phase region of a circulation tank is released outside the system as an exhaust gas. In Patent Literature 1, since gas in the gas phase region of the circulator tank is purged using the anode gas, cathode gas released into the gas phase region from the electrolytic solution in the circulator tank, in addition to the anode gas supplied to the gas phase region, is mixed in the gas discharged from the gas phase region of the circulator tank. Thus, in Patent Literature 1, even if the gas discharged from the gas phase region of the circulator tank was retrieved, it is difficult to obtain anode gas of high purity.

As a means for solving such a problem, one may consider storing the electrolytic solution retrieved from the anode chamber, and the electrolytic solution retrieved from the cathode chamber in separate circulator tanks respectively. That is, one may consider storing the electrolytic solution retrieved from the anode chamber in an anode side circulator tank, and supplying the electrolytic solution stored in the anode side circulator tank to the anode chamber; and storing the electrolytic solution retrieved from the cathode chamber in a cathode side circulator tank, and supplying the electrolytic solution stored in the cathode side circulator tank to the cathode chamber. In an electrolytic process of an alkaline water, however, since a water consumption per 1 mol of an electron is different between an anode reaction and a cathode reaction, progress in an electrolysis reaction leads to a difference in liquid levels between the anode side circulator tank and the cathode side circulator tank. If a pipe (communicating pipe) communicating a liquid phase region of the anode side circulator tank and a liquid phase region of the cathode side circulator tank is further provided for suppressing a rise of the difference in liquid levels between the anode side circulator tank and the cathode side circulator tank, the electrolytic solution flows into one tank from the other tank through the communicating pipe, and at the same time the electrolytic solution flowing in through the communicating pipe brings a dissolved gas together, which may result in the gas composition in a gas phase region of the tank into which the electrolytic solution flows through the communicating pipe reaching a flammability limit.

An object of the present invention is to provide an apparatus for alkaline water electrolysis which can prevent the gas composition in a gas phase part of a circulator tank from reaching a flammability limit, and which makes it possible to produce both hydrogen gas and oxygen gas as lessening a bad effect of a dissolved gas in an electrolyte, on gas purity. Another object of the present invention is to provide a method for producing oxygen gas and hydrogen gas which can prevent the gas composition in a gas phase part of a circulator tank from reaching a flammability limit, and which makes it possible to produce both hydrogen gas and oxygen gas as lessening a bad effect of a dissolved gas in an electrolyte, on gas purity.

Solution to Problem

The present invention encompasses the following aspects [1] to [9].

[1] An apparatus for alkaline water electrolysis, the apparatus comprising:
an electrolysis vessel comprising:
an anode chamber generating oxygen gas;
an anode arranged in the anode chamber;
a cathode chamber generating hydrogen gas;
a cathode arranged in the cathode chamber; and
an ion-permeable separating membrane separating the anode chamber and the cathode chamber;
a first gas-liquid separator being connected with the anode chamber and separating a first electrolyte and oxygen gas flowing out from the anode chamber;
a second gas-liquid separator being connected with the cathode chamber and separating a second electrolyte and hydrogen gas flowing out from the cathode chamber;
a first electrolyte tank being connected with the first gas-liquid separator, and receiving and storing the first electrolyte separated by the first gas-liquid separator;
a second electrolyte tank being connected with the second gas-liquid separator, and receiving and storing the second electrolyte separated by the second gas-liquid separator;
an oxygen gas feed pipe being connected with the first gas-liquid separator and the first electrolyte tank, and introducing oxygen gas separated by the first gas-liquid separator into a gas phase part of the first electrolyte tank;
a hydrogen gas feed pipe being connected with the second gas-liquid separator and the second electrolyte tank, and introducing hydrogen gas separated by the second gas-liquid separator into a gas phase part of the second electrolyte tank;
an oxygen gas exhaust pipe being connected with the first electrolyte tank and allowing oxygen gas to flow out from the gas phase part of the first electrolyte tank through the oxygen gas exhaust pipe;
a hydrogen gas exhaust pipe being connected with the second electrolyte tank and allowing hydrogen gas to flow out from the gas phase part of the second electrolyte tank through the hydrogen gas exhaust pipe; and
a circulator supplying the first electrolyte and the second electrolyte from the first electrolyte tank and the second electrolyte tank to the anode chamber and the cathode chamber,
wherein the first electrolyte and the second electrolyte are alkaline water.

[2] The apparatus according to [1],
the circulator comprising:
a manifold connected with the first electrolyte tank and the second electrolyte tank; and
a circulator pump being connected with the manifold and the electrolysis vessel, and supplying the first electrolyte and the second electrolyte guided through the manifold to the anode chamber and the cathode chamber.

[3] The apparatus according to [1],
the circulator comprising:
a first circulator pump supplying the first electrolyte from the first electrolyte tank to the anode chamber; and
a second circulator pump supplying the second electrolyte from the second electrolyte tank to the cathode chamber.

[4] The apparatus according to any one of [1] to [3], further comprising:
a first gas composition detector monitoring a gas composition in the gas phase part of the first electrolyte tank; and
a second gas composition detector monitoring a gas composition in the gas phase part of the second electrolyte tank.

[5] The apparatus according to any one of [1] to [4], further comprising:
a communicating pipe connecting a liquid phase part of the first electrolyte tank and a liquid phase part of the second electrolyte tank, such that the first electrolyte and the second electrolyte can flow through the communicating pipe.

[6] A method for producing oxygen gas and hydrogen gas, the method comprising:
electrolyzing a first electrolyte and a second electrolyte by means of an electrolysis vessel, wherein the first electrolyte and the second electrolyte are alkaline water, and wherein the electrolysis vessel comprises: an anode chamber generating oxygen gas; an anode arranged in the anode chamber; a cathode chamber generating hydrogen gas; a cathode arranged in the cathode chamber; and an ion-permeable separating membrane separating the anode chamber and the cathode chamber;
(a) applying an electric current between the anode and the cathode while supplying the first electrolyte and the second electrolyte to the anode chamber and the cathode chamber, to generate oxygen gas from the anode and hydrogen gas from the cathode;
(b) retrieving a first gas-liquid mixture from the anode chamber, the first gas-liquid mixture comprising the first electrolyte and oxygen gas;
(c) retrieving a second gas-liquid mixture from the cathode chamber, the second gas-liquid mixture comprising the second electrolyte and hydrogen gas;
(d) subjecting the first gas-liquid mixture to gas-liquid separation;
(e) subjecting the second gas-liquid mixture to gas-liquid separation;
(f) storing in a first electrolyte tank the first electrolyte separated by the gas-liquid separation of the first gas-liquid mixture;
(g) storing in a second electrolyte tank the second electrolyte separated by the gas-liquid separation of the second gas-liquid mixture;
(h) introducing oxygen gas separated by the gas-liquid separation of the first gas-liquid mixture into a gas phase part of the first electrolyte tank;
(i) introducing hydrogen gas separated by the gas-liquid separation of the second gas-liquid mixture into a gas phase part of the second electrolyte tank;
(j) retrieving oxygen gas from the gas phase part of the first electrolyte tank;
(k) retrieving hydrogen gas from the gas phase part of the second electrolyte tank; and (l) supplying the first electrolyte and the second electrolyte from the first electrolyte tank and the second electrolyte tank to the anode chamber and the cathode chamber.

[7] The method according to [6],
the (l) comprising:
supplying a mixture of the first electrolyte stored in the first electrolyte tank and the second electrolyte stored in the second electrolyte tank to the anode chamber and the cathode chamber.

[8] The method according to [6],
the (l) comprising:
supplying the first electrolyte stored in the first electrolyte tank to the anode chamber; and
supplying the second electrolyte stored in the second electrolyte tank to the cathode chamber.

[9] The method according to any one of [6] to [8], further comprising:
(m) monitoring a gas composition in the gas phase part of the first electrolyte tank; and
(n) monitoring a gas composition in the gas phase part of the second electrolyte tank.

Advantageous Effects of Invention

In the apparatus for alkaline water electrolysis of the present invention, the oxygen gas feed pipe introduces oxygen gas retrieved from the anode chamber into the gas phase part of the first electrolyte tank storing the electrolyte retrieved from the anode chamber, and oxygen gas flows out from the gas phase part of the first electrolyte tank through the oxygen gas exhaust pipe;
and the hydrogen gas feed pipe introduces hydrogen gas retrieved from the cathode chamber into the gas phase part of the second electrolyte tank storing the electrolyte retrieved from the cathode chamber, and hydrogen gas flows out from the gas phase part of the second electrolyte tank through the hydrogen gas exhaust pipe. Thus, the apparatus for alkaline water electrolysis of the present invention can prevent the gas compositions in the gas phase parts of the circulator tanks from reaching a flammability limit, and makes it possible to produce both hydrogen gas and oxygen gas as lessening a bad effect of a dissolved gas in the electrolyte on gas purity.

In the method for producing hydrogen gas and oxygen gas of the present invention, particularly owing to the inclusion of steps (f) to (k), oxygen gas retrieved from the anode chamber is introduced into the gas phase part of the first electrolyte tank storing the electrolyte retrieved from the anode chamber, and oxygen gas is retrieved from the gas phase part of the first electrolyte tank; and hydrogen gas retrieved from the cathode chamber is introduced into the gas phase part of the second electrolyte tank storing the electrolyte retrieved from the cathode chamber, and hydrogen gas is retrieved from the gas phase part of the second electrolyte tank. Thus, the method for producing hydrogen gas and oxygen gas of the present invention can prevent the gas compositions in the gas phase parts of the circulator tanks from reaching a flammability limit, and makes it possible to produce both hydrogen gas and oxygen gas as lessening a bad effect of a dissolved gas in the electrolyte on gas purity.

DETAILED DESCRIPTION OF EMBODIMENTS

Figure 1:
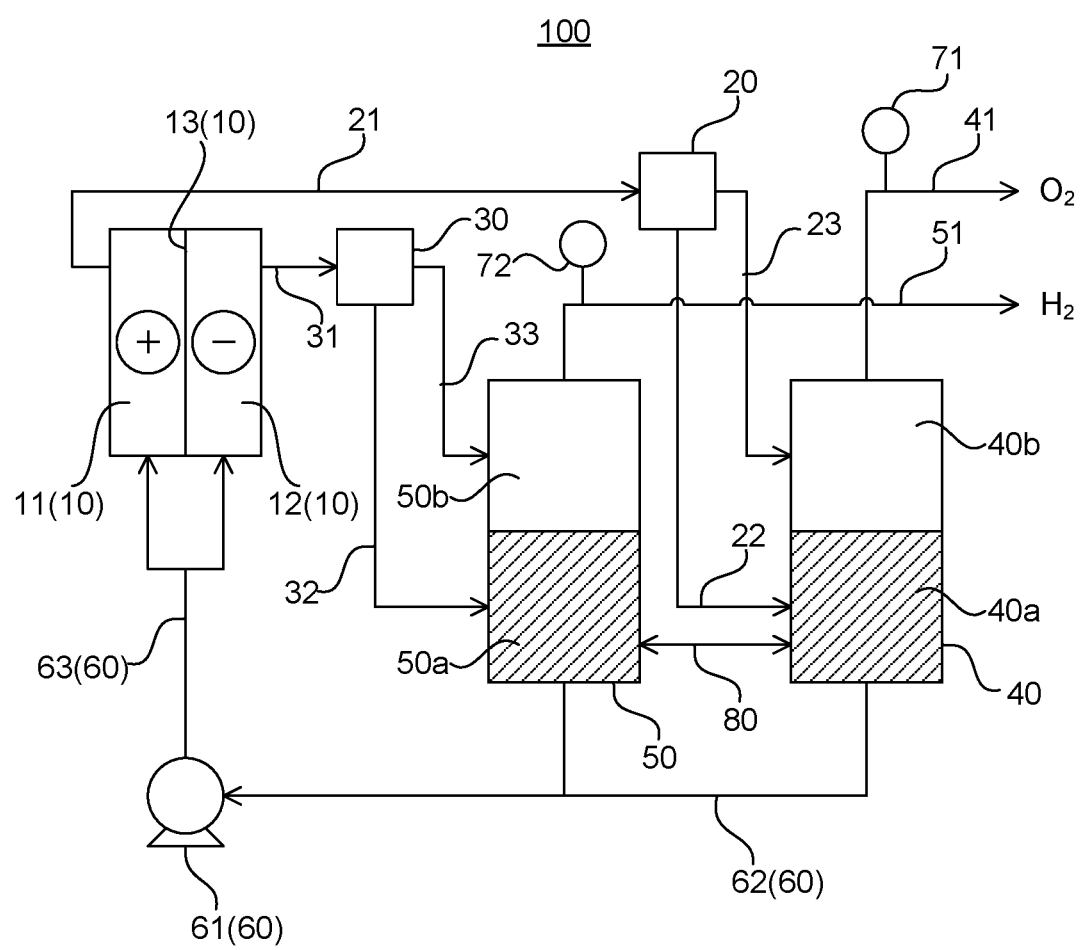
FIG. 1 is a schematically explanatory view of an apparatus for alkaline water electrolysis 100 according to one embodiment of the present invention.

The above described effects and advantages of the present invention will be made clear from the following description of the embodiments. Hereinafter the embodiments of the present invention will be described with reference to the drawings. The present invention is not limited to these embodiments. The measures in the drawings do not always represent the exact measures. Some reference signs may be omitted in the drawings. In the present description, expression "A to B" concerning numeral values A and B shall mean "no less than A and no more than B" unless otherwise specified. In such expression, if a unit is added only to the numeral value B, this unit shall be applied to the numeral value A as well. A word "or" shall mean a logical sum unless otherwise specified.

<1. Apparatus for Alkaline Water Electrolysis (1)>

FIG. 1 is a schematically explanatory view of an apparatus for alkaline water electrolysis 100 (hereinafter may be referred to as "electrolysis apparatus 100") according to one embodiment of the present invention. The electrolysis apparatus 100 is an apparatus to electrolyze an alkaline water to produce oxygen gas and hydrogen gas using the alkaline water as an electrolyte. The electrolysis apparatus 100 includes an electrolysis vessel 10, a first gas-liquid separator 20, a second gas-liquid separator 30, a first electrolyte tank 40, a second electrolyte tank 50, and a circulator 60. In FIG. 1, the arrows point directions where substances flow.

The electrolysis vessel 10 includes an anode chamber 11 in which an anode is arranged and which generates oxygen gas, a cathode chamber 12 in which a cathode is arranged and which generates hydrogen gas, and an ion-permeable separating membrane 13 separating the anode chamber 11 and the cathode chamber 12. Any electrolysis vessel conventionally used for apparatuses for alkaline water electrolysis may be employed for the electrolysis vessel 10 without particular limitations.

The first gas-liquid separator 20 is connected with the anode chamber 11 via an anolyte and gas retrieving pipe 21, and separates the electrolyte and oxygen gas flowing out of the anode chamber 11. The second gas-liquid separator 30 is connected with the cathode chamber 12 via a catholyte and gas retrieving pipe 31, and separates the electrolyte and hydrogen gas flowing out of the cathode chamber 12. Any gas-liquid separator conventionally used for apparatuses for alkaline water electrolysis may be employed for the first gas-liquid separator 20 and the second gas-liquid separator 30 without particular limitations.

The first electrolyte tank 40 is connected with the first gas-liquid separator 20, and receives and stores the electrolyte separated by the first gas-liquid separator 20. The electrolyte separated by the first gas-liquid separator 20 is guided to the first electrolyte tank 40 through an anolyte exhaust pipe 22. A liquid phase part 40a occupied by the stored electrolyte, and a gas phase part 40b that is over the liquid phase part 40a are present inside the first electrolyte tank 40.

The second electrolyte tank 50 is connected with the second gas-liquid separator 30, and receives and stores the electrolyte separated by the second gas-liquid separator 30. The electrolyte separated by the second gas-liquid separator 30 is guided to the second electrolyte tank 50 through a catholyte exhaust pipe 32. A liquid phase part 50a occupied by the stored electrolyte, and a gas phase part 50*b* that is over the liquid phase part 50*a* are present inside the second electrolyte tank 50.

A communicating pipe 80 connects the liquid phase part 40*a* of the first electrolyte tank 40 and the liquid phase part 50*a* of the second electrolyte tank 50, such that the electrolyte can flow therethrough. That is, the electrolyte occupying the liquid phase part 40*a* of the first electrolyte tank 40 can move to the liquid phase part 50*a* of the second electrolyte tank 50 through the communicating pipe 80; and the electrolyte occupying the liquid phase part 50*a* of the second electrolyte tank 50 can move to the liquid phase part 40*a* of the first electrolyte tank 40 through the communicating pipe 80.

The circulator 60 supplies the electrolyte from the first electrolyte tank 40 and the second electrolyte tank 50 to the anode chamber 11 and the cathode chamber 12. The circulator 60 includes a manifold 62 that is connected with the liquid phase part 40*a* of the first electrolyte tank 40 and the liquid phase part 50*a* of the second electrolyte tank; and a circulator pump 61 that is connected with the manifold 62 and the electrolysis vessel 10, and supplies the electrolyte guided through the manifold 62 to the anode chamber 11 and the cathode chamber 12 through an electrolyte feed pipe 63. The electrolyte feed pipe 63 branches on the way, and branches thereof guide the electrolyte fed from the circulator pump 61 to the anode chamber 11 and the cathode chamber 12 respectively. Any circulator pump conventionally used for apparatuses for alkaline water electrolysis may be employed for the circulator pump 61 without particular limitations.

The electrolysis apparatus 100 further includes an oxygen gas feed pipe 23 connected with the first gas-liquid separator 20 and the first electrolyte tank 40, and introducing oxygen gas separated by the first gas-liquid separator 20 into the gas phase part 40*b* of the first electrolyte tank 40; and a hydrogen gas feed pipe 33 connected with the second gas-liquid separator 30 and the second electrolyte tank 50, and introducing hydrogen gas separated by the second gas-liquid separator 30 into the gas phase part 50*b* of the second electrolyte tank 50.

The electrolysis apparatus 100 further includes an oxygen gas exhaust pipe 41 connected with the first electrolyte tank 40, and allows oxygen gas to flow out from the gas phase part 40*b* of the first electrolyte tank 40 therethrough; and a hydrogen gas exhaust pipe 51 connected with the second electrolyte tank 50, and allows hydrogen gas to flow out from the gas phase part 50*b* of the second electrolyte tank 50 therethrough. Oxygen gas produced in the electrolysis apparatus 100 is finally retrieved from the oxygen gas exhaust pipe 41, and hydrogen gas produced in the electrolysis apparatus 100 is finally retrieved from the hydrogen gas exhaust pipe 51.

The electrolysis apparatus 100 further includes a first gas composition detector 71 monitoring the gas composition in the gas phase part 40*b* of the first electrolyte tank 40; and a second gas composition detector 72 monitoring the gas composition in the gas phase part 50*b* of the second electrolyte tank 50. In the electrolysis apparatus 100, the first gas composition detector 71 is connected on a gas output side of the first electrolyte tank 40 (that is, in the middle of the oxygen gas exhaust pipe 41), and the second gas composition detector 72 is connected on a gas output side of the second electrolyte tank 50 (that is, in the middle of the hydrogen gas exhaust pipe 51). Any conventional gas composition detector which can measure the concentration of hydrogen gas in a gas whose major component is oxygen may be employed for the first gas composition detector 71 without particular limitations; and any conventional gas composition detector which can measure the concentration of oxygen gas in a gas whose major component is hydrogen may be employed for the second gas composition detector 72 without particular limitations.

<2. Method for Producing Oxygen Gas and Hydrogen Gas (1)>

The operation of the electrolysis apparatus 100, and the method for producing oxygen gas and hydrogen gas using the electrolysis apparatus 100 will be further described with reference to FIG. 1.

An electric current is applied between the anode arranged in the anode chamber 11 and the cathode arranged in the cathode chamber 12 while the electrolyte is supplied to the anode chamber 11 and the cathode chamber 12 of the electrolysis vessel 10, to generate oxygen gas from the anode in the anode chamber 11 and hydrogen gas from the cathode in the cathode chamber 12 (step (a)).

A first gas-liquid mixture containing the electrolyte and oxygen gas generated in the anode chamber 11 is retrieved from the anode chamber 11 (step (b)). The first gas-liquid mixture retrieved from the anode chamber 11 is guided to the first gas-liquid separator 20 through the anolyte and gas retrieving pipe 21.

A second gas-liquid mixture containing the electrolyte and hydrogen gas generated in the cathode chamber 12 is retrieved from the cathode chamber 12 (step (c)). The second gas-liquid mixture retrieved from the cathode chamber 12 is guided to the second gas-liquid separator 30 through the catholyte and gas retrieving pipe 31.

The first gas-liquid mixture guided from the anode chamber 11 through the anolyte and gas retrieving pipe 21 is subjected to gas-liquid separation in the first gas-liquid separator 20 (step (d)). The first gas-liquid separator 20 allows the separated electrolyte (anolyte) to flow out to the anolyte exhaust pipe 22, and allows the separated oxygen gas to flow out to the oxygen gas feed pipe 23.

The second gas-liquid mixture guided from the cathode chamber 12 through the catholyte and gas retrieving pipe 31 is subjected to gas-liquid separation in the second gas-liquid separator 30 (step (e)). The second gas-liquid separator 30 allows the separated electrolyte (catholyte) to flow out to the catholyte exhaust pipe 32, and allows the separated hydrogen gas to flow out to the hydrogen gas feed pipe 33.

The electrolyte (anolyte) separated in the first gas-liquid separator 20 is guided to the first electrolyte tank 40 through the anolyte exhaust pipe 22, and stored in the first electrolyte tank 40 (step (f)).

The electrolyte (catholyte) separated in the second gas-liquid separator 30 is guided to the second electrolyte tank 50 through the catholyte exhaust pipe 32, and stored in the second electrolyte tank 50 (step (g)).

Oxygen gas separated in the first gas-liquid separator 20 is guided to the gas phase part 40*b* of the first electrolyte tank 40 through the oxygen gas feed pipe 23 (step (h)).

Hydrogen gas separated in the second gas-liquid separator 30 is guided to the gas phase part 50*b* of the second electrolyte tank 50 through the hydrogen gas feed pipe 33 (step (i)).

Oxygen gas in the gas phase part 40*b* of the first electrolyte tank 40 is retrieved from the gas phase part 40*b* through the oxygen gas exhaust pipe 41 (step (j)). A gas retrieved from the gas phase part 40*b* through the oxygen gas exhaust pipe 41 contains, in addition to oxygen gas guided to the gas phase part 40*b* through the oxygen gas feed pipe 23, a dissolved gas released from the electrolyte occupying the liquid phase part 40a of the first electrolyte tank 40 to the gas phase part 40b. As described above, in step (a), an electric current is applied between the anode arranged in the anode chamber 11 and the cathode arranged in the cathode chamber 12 while the electrolyte is supplied to the anode chamber 11 and the cathode chamber 12 of the electrolysis vessel 10, to generate oxygen gas from the anode in the anode chamber 11 and hydrogen gas from the cathode in the cathode chamber 12. In the electrolysis vessel 10, the anode chamber 11 and the cathode chamber 12 are separated by the ion-permeable separating membrane 13. The gas barrier property of the separating membrane 13 is usually not perfect. Oxygen gas retrieved from the anode chamber 11 is thus contaminated by a slight amount of hydrogen gas generated in the cathode chamber 12 adjacent to the anode chamber 11. Likewise, hydrogen gas retrieved from the cathode chamber 12 is contaminated by a slight amount of oxygen gas generated in the anode chamber 11 adjacent to the cathode chamber 12. When the first gas-liquid separator 20 and the second gas-liquid separator 30 each include a wetted part containing a metallic material, and a sacrificial electrode for suppressing electric corrosion of the metallic material, an adverse electrolysis reaction occurs due to a leakage current from the electrolysis vessel 10, which causes a minute amount of hydrogen gas to be generated in the first gas-liquid separator 20 (oxygen gas side) to mix in oxygen gas flowing out from the first gas-liquid separator 20, and which causes a minute amount of oxygen gas to be generated in the second gas-liquid separator 30 (hydrogen gas side) to mix in hydrogen gas flowing out from the second gas-liquid separator 30. Thus, not only oxygen gas but also a slight amount of hydrogen gas is contained in the dissolved gas in the electrolyte occupying the liquid phase part 40a. However, even if being released from the liquid phase part 40a to the gas phase part 40b, this hydrogen gas is promptly discharged from the gas phase part 40b through the oxygen gas exhaust pipe 41 together with oxygen gas guided to the gas phase part 40b through the oxygen gas feed pipe 23, which prevents the concentration of hydrogen gas in the gas phase part 40b from increasing to reach a flammability limit. In addition, since the electrolyte occupying the liquid phase part 40a of the first electrolyte tank 40 is the electrolyte (anolyte) retrieved from the anode chamber 11, the major component of the dissolved gas in the electrolyte is oxygen gas. That is, even if hydrogen gas is contained as the dissolved gas in the electrolyte, this hydrogen gas is merely a minor component of the dissolved gas. Therefore, the dissolved gas released from the electrolyte occupying the liquid phase part 40a of the first electrolyte tank 40 to the gas phase part 40b affects the purity of oxygen gas retrieved from the oxygen gas exhaust pipe 41 to an only limited degree.

Hydrogen gas in the gas phase part 50b of the second electrolyte tank 50 is retrieved from the gas phase part 50b through the hydrogen gas exhaust pipe 51 (step (k)). A gas retrieved from the gas phase part 50b through the hydrogen gas exhaust pipe 51 contains, in addition to hydrogen gas guided into the gas phase part 50b through the hydrogen gas feed pipe 33, a dissolved gas released from the electrolyte occupying the liquid phase part 50a of the second electrolyte tank 50 to the gas phase part 50b. Not only hydrogen gas but also a slight amount of oxygen gas is slightly contained in this dissolved gas in reversed relationship with the above described case of the liquid phase part 40a of the first electrolyte tank 40. However, even if being released from the liquid phase part 50a to the gas phase part 50b, this oxygen gas is promptly discharged from the gas phase part 50b through the hydrogen gas exhaust pipe 51 together with hydrogen gas guided to the gas phase part 50b through the hydrogen gas feed pipe 33, which prevents the concentration of oxygen gas in the gas phase part 50b from increasing to reach a flammability limit. In addition, since the electrolyte occupying the liquid phase part 50a of the second electrolyte tank 50 is the electrolyte (catholyte) retrieved from the cathode chamber 12, the major component of the dissolved gas in the electrolyte is hydrogen gas. That is, even if oxygen gas is contained as the dissolved gas in the electrolyte, this oxygen gas is merely a minor component of the dissolved gas. Therefore, the dissolved gas released from the electrolyte occupying the liquid phase part 50a of the second electrolyte tank 50 to the gas phase part 50b affects the purity of hydrogen gas retrieved from the hydrogen gas exhaust pipe 51 to an only limited degree.

The electrolyte stored in the first electrolyte tank 40 and the second electrolyte tank 50 is guided to the circulator pump 61 through the manifold 62 and fed from the circulator pump 61, and a mixture of the electrolyte guided from the first electrolyte tank 40 and the electrolyte guided from the second electrolyte tank 50 is supplied to the anode chamber 11 and the cathode chamber 12 through an electrolyte feed pipe 63 (step (l)). Continuous operation of the electrolysis apparatus 100, that is, continuous performance of steps (a) to (l) at the same time results in continuous production of oxygen gas and hydrogen gas using alkaline water electrolysis. When a difference in the rate of a water consumption between a cathode reaction and an anode reaction or the like causes a difference between electrolyte levels in the first electrolyte tank 40 and the second electrolyte tank 50 while the electrolysis apparatus 100 is operated, the electrolyte moves from one electrolyte tank to the other electrolyte tank through the communicating pipe 80, to reduce or remove the difference between the electrolyte levels. In an electrolysis apparatus including such a communicating pipe, an electrolyte flows into one tank from the other tank through the communicating pipe, and at the same time the electrolyte flowing in through the communicating pipe brings a dissolved gas therein together, which makes it easier for the gas composition in a gas phase part of the tank into which the electrolyte flowing through the communicating pipe to reach a flammability limit when the electrolysis apparatus does not have the structure of the present invention. In contrast, the electrolysis apparatus of the present invention can prevent the gas composition in the gas phase part of each electrolyte tank from reaching a flammability limit even if including such a communicating pipe. An electrolysis apparatus including such a communicating pipe thus can be more remarkably benefited from the effect of the invention, that is, to prevent the gas composition in the gas phase part of each electrolyte tank from reaching a flammability limit.

The gas composition in the gas phase part 40b of the first electrolyte tank 40 is monitored with the first gas composition detector 71 arranged on the gas output side of the first electrolyte tank 40 (step (m)). Since the gas composition observed on the gas output side of the first electrolyte tank 40 is the same as the gas composition in the gas phase part 40b, the gas composition in the gas phase part 40b can be monitored with a gas composition detector arranged on the gas output side of the first electrolyte tank 40.

The gas composition in the gas phase part 50b of the second electrolyte tank 50 is monitored with the second gas composition detector 72 arranged on the gas output side of the second electrolyte tank 50 (step (n)). Since the gas composition observed on the gas output side of the second electrolyte tank 50 is the same as the gas composition in the gas phase part 50b, the gas composition in the gas phase part 50b can be monitored with a gas composition detector arranged on the gas output side of the second electrolyte tank 50.

Monitoring the gas composition with the first gas composition detector 71 (step (m)), and monitoring the gas composition with the second gas composition detector 72 (step (n)) may be continuously carried out, and may be intermittently carried out; and are preferably carried out continuously in view of early detection of an abnormality in the electrolysis apparatus 100.

In the above description on the present invention, the electrolysis apparatus 100 including the first gas composition detector 71 arranged on the gas output side of the first electrolyte tank 40, and the second gas composition detector 72 arranged on the gas output side of the second electrolyte tank 50; and the method for producing oxygen gas and hydrogen gas using this electrolysis apparatus 100 have been described as an example. The present invention is not limited to these embodiments. The first gas composition detector and the second gas composition detector may be arranged at positions except the gas output sides of the electrolyte tanks. For example, the gas composition detectors may be arranged in the gas phase parts of the electrolyte tanks respectively. For example, the gas composition detectors may be arranged on the gas output sides of the gas-liquid separators (upstream sides of the electrolyte tanks) respectively. In the apparatus for alkaline water electrolysis of the present invention, gases retrieved from the electrolysis vessel is taken out after passing through the gas phase parts of the electrolyte tanks respectively. Thus, even when the gas composition detectors are arranged on the gas output sides of the gas-liquid separators (upstream sides of the electrolyte tanks) respectively, the gas composition in the gas phase part of each electrolyte tank can be monitored. For example, the apparatus for alkaline water electrolysis may include no first gas composition detector or second gas composition detector.

In the above description on the present invention, the electrolysis apparatus 100 including the communicating pipe 80 connecting the liquid phase part 40a of the first electrolyte tank 40 and the liquid phase part 50a of the second electrolyte tank 50, such that the electrolyte can flow therethrough; and the method for producing oxygen gas and hydrogen gas using this electrolysis apparatus have been described as an example. The present invention is not limited to these embodiments. For example, the apparatus for alkaline water electrolysis may include no communicating pipe connecting the liquid phase part of the first electrolyte tank and the liquid phase part of the second electrolyte tank.

<3. Apparatus for Alkaline Water Electrolysis (2)>

Figure 2:
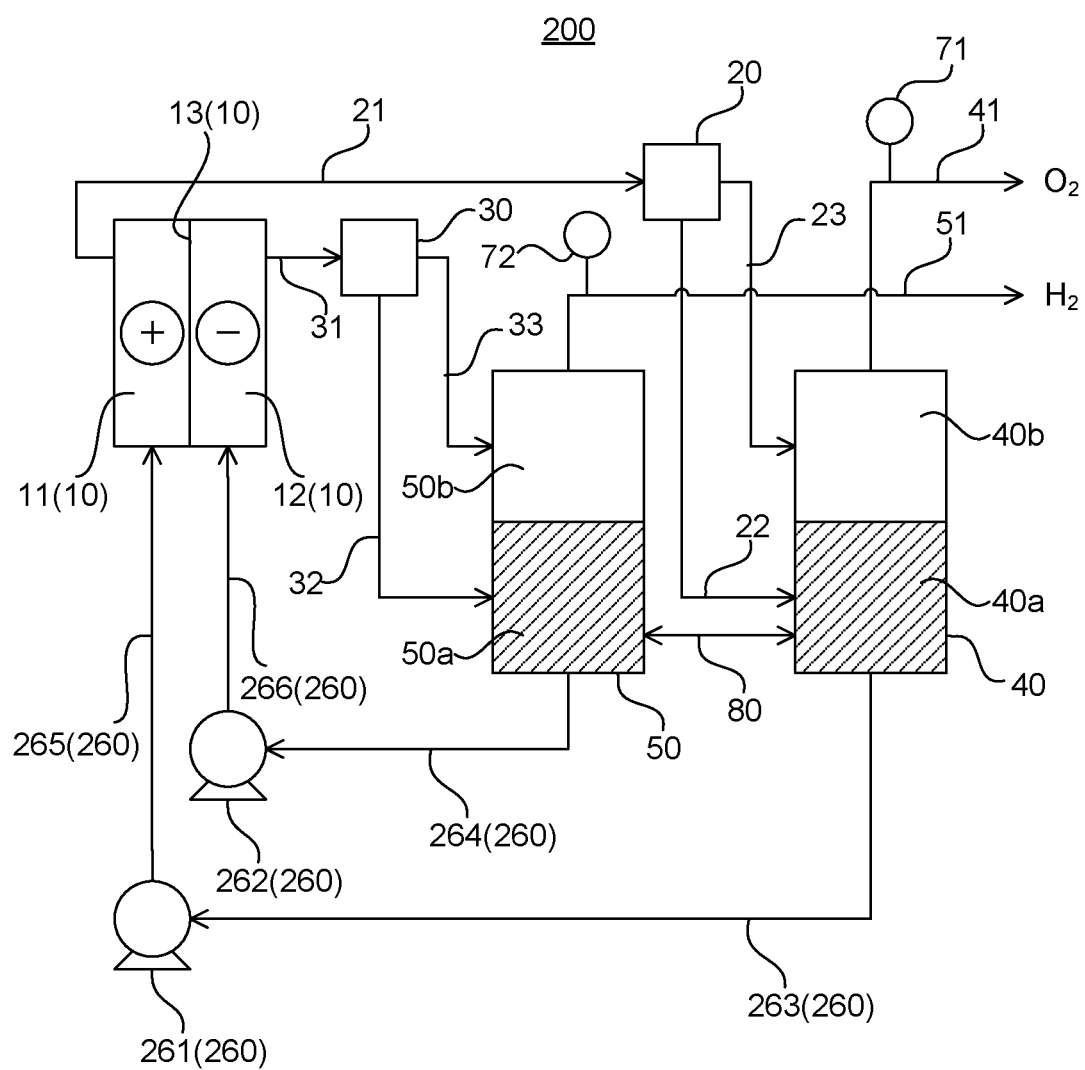
FIG. 2 is a schematically explanatory view of an apparatus for alkaline water electrolysis 200 according to another embodiment of the present invention.

In the above description on the present invention, the electrolysis apparatus 100 wherein the circulator 60 includes the manifold 62 connected with the first electrolyte tank 40 and the second electrolyte tank 50, and the circulator pump 61 connected with the manifold 62 and the electrolysis vessel 10, and supplies the electrolyte guided through the manifold 62 to the anode chamber 11 and the cathode chamber 12; and the method for producing oxygen gas and hydrogen gas using this electrolysis apparatus 100 have been described as an example. The present invention is not limited to these embodiments. For example, in the apparatus for alkaline water electrolysis, the circulator may include a first circulator pump supplying the electrolyte from the first electrolyte tank to the anode chamber, and a second circulator pump supplying the electrolyte from the second electrolyte tank to the cathode chamber. FIG. 2 is a schematically explanatory view of an apparatus for alkaline water electrolysis 200 (hereinafter may be referred to as "electrolysis apparatus 200") according to such another embodiment. In FIG. 2, the elements same as those already shown in FIG. 1 are given the same reference signs as in FIG. 1, and the description thereof may be omitted.

The electrolysis apparatus 200 is different from the above described electrolysis apparatus 100 in inclusion of a circulator 260 instead of the circulator 60. The circulator 260 includes a first circulator pump 261 supplying the electrolyte from the first electrolyte tank 40 to the anode chamber 11, and a second circulator pump 262 supplying the electrolyte from the second electrolyte tank 50 to the cathode chamber 12. The circulator 260 further includes a pipe 263 guiding the electrolyte from the liquid phase part 40a of the first electrolyte tank 40 to the first circulator pump 261, and a pipe 265 guiding the electrolyte fed from the first circulator pump 261 to the anode chamber 11. The circulator 260 further includes a pipe 264 guiding the electrolyte from the liquid phase part 50a of the second electrolyte tank 50 to the second circulator pump 262, and a pipe 266 guiding the electrolyte fed from the second circulator pump 262 to the cathode chamber 12. Any circulator pump conventionally used for apparatuses for alkaline water electrolysis may be employed for the first circulator pump 261 and the second circulator pump 262 without particular limitations.

<4. Method for Producing Oxygen Gas and Hydrogen Gas (2)>

The operation of the electrolysis apparatus 200, and the method for producing oxygen gas and hydrogen gas using the electrolysis apparatus 200 will be further described with reference to FIG. 2. Only step (l) in the method for producing oxygen gas and hydrogen gas using the electrolysis apparatus 200 is different. That is, the electrolyte stored in the first electrolyte tank 40 is guided to the first circulator pump 261 through the pipe 263, fed from the first circulator pump 261, and supplied to the anode chamber 11 through the pipe 265; and the electrolyte stored in the second electrolyte tank 50 is guided to the second circulator pump 262 through the pipe 264, fed from the second circulator pump 262, and supplied to the cathode chamber through the pipe 266 (step (l')).

Continuous operation of the electrolysis apparatus 200, that is, continuous performance of steps (a) to (k) and (l') at the same time results in continuous production of oxygen gas and hydrogen gas using alkaline water electrolysis. When a difference in the rate of a water consumption between a cathode reaction and an anode reaction or the like causes a difference between electrolyte levels in the first electrolyte tank 40 and the second electrolyte tank 50 while the electrolysis apparatus 200 is operated, the electrolyte moves from one electrolyte tank to the other electrolyte tank through the communicating pipe 80, to reduce or remove the difference between the electrolyte levels.

The above described effect in relation to the electrolysis apparatus 100 can be obtained by such an electrolysis apparatus 200, and the method for producing oxygen gas and hydrogen gas using such an electrolysis apparatus 200.

REFERENCES SIGNS LIST 100, 200 electrolysis apparatus
10 electrolysis vessel
11 anode chamber
12 cathode chamber
13 (ion-permeable) separating membrane 20 first gas-liquid separator
21 anolyte and gas retrieving pipe
22 anolyte exhaust pipe
23 oxygen gas feed pipe
30 second gas-liquid separator
31 catholyte and gas retrieving pipe
32 catholyte exhaust pipe
33 hydrogen gas feed pipe
40 first electrolyte tank
40a, 50a liquid phase part
40b, 50b gas phase part
41 oxygen gas exhaust pipe
50 second electrolyte tank
51 hydrogen gas exhaust pipe
60, 260 circulator
61 circulator pump
62 manifold
63 electrolyte feed pipe
261 first circulator pump
262 second circulator pump
263, 264, 265, 266 pipe
71 first gas composition detector
72 second gas composition detector
80 communicating pipe

We claim:

1. An apparatus for alkaline water electrolysis, the apparatus comprising:
an electrolysis vessel comprising:
an anode chamber generating oxygen gas;
an anode arranged in the anode chamber;
a cathode chamber generating hydrogen gas;
a cathode arranged in the cathode chamber; and
an ion-permeable separating membrane separating the anode chamber and the cathode chamber;
a first gas-liquid separator being connected with the anode chamber and separating a first electrolyte and oxygen gas flowing out from the anode chamber;
a second gas-liquid separator being connected with the cathode chamber and separating a second electrolyte and hydrogen gas flowing out from the cathode chamber;
a first electrolyte tank being connected with the first gas-liquid separator, and receiving and storing the first electrolyte separated by the first gas-liquid separator;
a second electrolyte tank being connected with the second gas-liquid separator, and receiving and storing the second electrolyte separated by the second gas-liquid separator;
an oxygen gas feed pipe being connected with the first gas-liquid separator and the first electrolyte tank, and introducing oxygen gas separated by the first gas-liquid separator into a gas phase part of the first electrolyte tank;
a hydrogen gas feed pipe being connected with the second gas-liquid separator and the second electrolyte tank, and introducing hydrogen gas separated by the second gas-liquid separator into a gas phase part of the second electrolyte tank;
an oxygen gas exhaust pipe being connected with the first electrolyte tank and allowing oxygen gas to flow out from the gas phase part of the first electrolyte tank through the oxygen gas exhaust pipe;
a hydrogen gas exhaust pipe being connected with the second electrolyte tank and allowing hydrogen gas to flow out from the gas phase part of the second electrolyte tank through the hydrogen gas exhaust pipe; and
a circulator supplying the first electrolyte and the second electrolyte from the first electrolyte tank and the second electrolyte tank to the anode chamber and the cathode chamber,
wherein the first electrolyte and the second electrolyte are alkaline water.

2. The apparatus according to claim 1,
the circulator comprising:
a manifold connected with the first electrolyte tank and the second electrolyte tank; and
a circulator pump being connected with the manifold and the electrolysis vessel, and supplying the first electrolyte and the second electrolyte guided through the manifold to the anode chamber and the cathode chamber.

3. The apparatus according to claim 1,
the circulator comprising:
a first circulator pump supplying the first electrolyte from the first electrolyte tank to the anode chamber; and
a second circulator pump supplying the second electrolyte from the second electrolyte tank to the cathode chamber.

4. The apparatus according to claim 1, further comprising:
a first gas composition detector monitoring a gas composition in the gas phase part of the first electrolyte tank; and
a second gas composition detector monitoring a gas composition in the gas phase part of the second electrolyte tank.

5. The apparatus according to claim 1, further comprising:
a communicating pipe connecting a liquid phase part of the first electrolyte tank and a liquid phase part of the second electrolyte tank, such that the first electrolyte and the second electrolyte can flow through the communicating pipe.

6. A method for producing oxygen gas and hydrogen gas, the method comprising:
electrolyzing a first electrolyte and a second electrolyte by means of an electrolysis vessel, wherein the first electrolyte and the second electrolyte are alkaline water, and wherein the electrolysis vessel comprises: an anode chamber generating oxygen gas; an anode arranged in the anode chamber; a cathode chamber generating hydrogen gas; a cathode arranged in the cathode chamber; and an ion-permeable separating membrane separating the anode chamber and the cathode chamber;
(a) applying an electric current between the anode and the cathode while supplying the first electrolyte and the second electrolyte to the anode chamber and the cathode chamber, to generate oxygen gas from the anode and hydrogen gas from the cathode;
(b) retrieving a first gas-liquid mixture from the anode chamber, the first gas-liquid mixture comprising the first electrolyte and oxygen gas;
(c) retrieving a second gas-liquid mixture from the cathode chamber, the second gas-liquid mixture comprising the second electrolyte and hydrogen gas;
(d) subjecting the first gas-liquid mixture to gas-liquid separation;
(e) subjecting the second gas-liquid mixture to gas-liquid separation;
(f) storing in a first electrolyte tank the first electrolyte separated by the gas-liquid separation of the first gas-liquid mixture;

(g) storing in a second electrolyte tank the second electrolyte separated by the gas-liquid separation of the second gas-liquid mixture;
(h) introducing oxygen gas separated by the gas-liquid separation of the first gas-liquid mixture into a gas phase part of the first electrolyte tank;
(i) introducing hydrogen gas separated by the gas-liquid separation of the second gas-liquid mixture into a gas phase part of the second electrolyte tank;
(j) retrieving oxygen gas from the gas phase part of the first electrolyte tank;
(k) retrieving hydrogen gas from the gas phase part of the second electrolyte tank; and
(l) supplying the first electrolyte and the second electrolyte from the first electrolyte tank and the second electrolyte tank to the anode chamber and the cathode chamber.

7. The method according to claim 6,
the (l) comprising:
   supplying a mixture of the first electrolyte stored in the first electrolyte tank and the second electrolyte stored in the second electrolyte tank to the anode chamber and the cathode chamber.

8. The method according to claim 6,
the (l) comprising:
   supplying the first electrolyte stored in the first electrolyte tank to the anode chamber; and
   supplying the second electrolyte stored in the second electrolyte tank to the cathode chamber.

9. The method according to claim 6, further comprising:
(m) monitoring a gas composition in the gas phase part of the first electrolyte tank; and
(n) monitoring a gas composition in the gas phase part of the second electrolyte tank.

* * * * *